US012801606B2

(12) United States Patent
Grzonkowski et al.

(10) Patent No.: US 12,801,606 B2
(45) Date of Patent: Nov. 17, 2026

(54) SYSTEMS AND METHODS FOR RESPONDING TO QUERIES WITH ARTIFICIAL INTELLIGENCE (AI) ASSISTANTS

(71) Applicant: Tenable, Inc., Columbia, MD (US)

(72) Inventors: Slawomir Grzonkowski, Dublin (IE); Vincent Gilcreest, Leopardstown (IE)

(73) Assignee: Tenable, Inc., Columbia, MD (US)

( * ) Notice: Subject to any disclaimer, the term of this patent is extended or adjusted under 35 U.S.C. 154(b) by 0 days.

(21) Appl. No.: 18/951,338

(22) Filed: Nov. 18, 2024

(65) Prior Publication Data

US 2026/0140946 A1 May 21, 2026

(51) Int. Cl.
*G06F 16/24* (2019.01)
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

2011/0295897 A1* 12/2011 Gao .................... G06F 16/3322 707/780
2017/0242860 A1* 8/2017 Souche ............... G06F 16/2455
2018/0012594 A1* 1/2018 Behzadi .............. G06F 16/3344
2020/0388285 A1* 12/2020 Spiewla .................. G06F 3/167
2024/0320251 A1* 9/2024 Hemington ........... G06F 16/338
2025/0140244 A1* 5/2025 Lee ..................... G10L 15/1815
2025/0173541 A1* 5/2025 Dolph .................... G06N 20/00
2025/0200093 A1* 6/2025 Padaliak ............... G06F 40/109
2025/0232041 A1* 7/2025 Patterson .............. G06F 21/577
2025/0284683 A1* 9/2025 Modelo-Howard ......................... G06F 16/243
2026/0003874 A1* 1/2026 Jootoo Ramesh Bapu ................. G06F 16/24569
2026/0087036 A1* 3/2026 Patthar ................ G06F 16/3329

FOREIGN PATENT DOCUMENTS

KR 20180134099 A * 12/2018 ............. G06N 5/003
KR 102039293 B1 * 10/2019 ....... G06F 16/90335

* cited by examiner

*Primary Examiner* — Augustine K. Obisesan

(74) *Attorney, Agent, or Firm* — MUNCY, GEISSLER, OLDS & LOWE, P.C.; Daniel Podhajny

(57) ABSTRACT

In some aspects, a component may receive a plurality of queries. The component may determine whether the plurality of queries belong to one or more query categories. The component may assign a plurality of artificial intelligence (AI) assistants to respond to the plurality of queries based on a determination that the plurality of queries belong to more than one query category. The component may transmit a plurality of responses to the plurality of queries generated by the plurality of AI assistants.

21 Claims, 11 Drawing Sheets

800

SYSTEMS AND METHODS FOR RESPONDING TO QUERIES WITH ARTIFICIAL INTELLIGENCE (AI) ASSISTANTS

BACKGROUND OF THE DISCLOSURE

1. Field of the Disclosure

Aspects relate to systems and methods for selecting appropriate artificial intelligence (AI) assistants and transitioning between the appropriate AI assistants to respond to queries.

2. Description of the Related Art

Many providers of large language models (LLMs) have been competing with each other to provide a leading solution for responding to natural-language queries by using AI assistants (e.g., chatbots, virtual agents, conversational agents, etc.). In many situations, however, users of AI assistants may not be able to find an optimal LLM that fulfils all their requirements. In such situations, users may need to use different AI assistants with different LLMs for different purposes in a single chat or assistant dialogue. In a typical chat session, the user may ask questions on different subjects even if they are related, and it is not expected that a single AI assistant would be able to provide the best or optimal answers to those questions.

For example, one AI assistant may be asked to respond to queries related to security (e.g., "What is a buffer overflow or SQL injection?"), another AI assistant to respond to queries about company products (e.g., "What is the Asset Criticality Ranking of an asset? How is it calculated?"), and then another AI assistant which would operate on customer-specific data that would not be openly accessible (e.g., "Show me my most vulnerable cloud assets that are running Ubuntu.").

Although efforts have been made to make a single LLM able to respond to various types of queries, it is expected that individuals and organizations may still face challenges and may not be able to simply rely on a single AI assistant or a single LLM to respond to their queries effectively.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, a method includes receiving a plurality of queries; determining whether the plurality of queries belong to one or more query categories; assigning a plurality of artificial intelligence (AI) assistants to respond to the plurality of queries based on a determination that the plurality of queries belong to more than one query category; and transmitting a plurality of responses to the plurality of queries generated by the plurality of AI assistants.

In some aspects, a component includes one or more memories; and one or more processors communicatively coupled to the one or more memories, the one or more processors, either alone or in combination, configured to: receive a plurality of queries; determine whether the plurality of queries belong to one or more query categories; assign a plurality of artificial intelligence (AI) assistants to respond to the plurality of queries based on a determination that the plurality of queries belong to more than one query category; and transmit a plurality of responses to the plurality of queries generated by the plurality of AI assistants.

In some aspects, a non-transitory computer-readable medium stores computer-executable instructions that, when executed by a component, cause the component to: receive a plurality of queries; determine whether the plurality of queries belong to one or more query categories; assign a plurality of artificial intelligence (AI) assistants to respond to the plurality of queries based on a determination that the plurality of queries belong to more than one query category; and transmit a plurality of responses to the plurality of queries generated by the plurality of AI assistants.

In some aspects, a component includes means for receiving a plurality of queries; means for determining whether the plurality of queries belong to one or more query categories; means for assigning a plurality of artificial intelligence (AI) assistants to respond to the plurality of queries based on a determination that the plurality of queries belong to more than one query category; and means for transmitting a plurality of responses to the plurality of queries generated by the plurality of AI assistants.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

Figure 1:
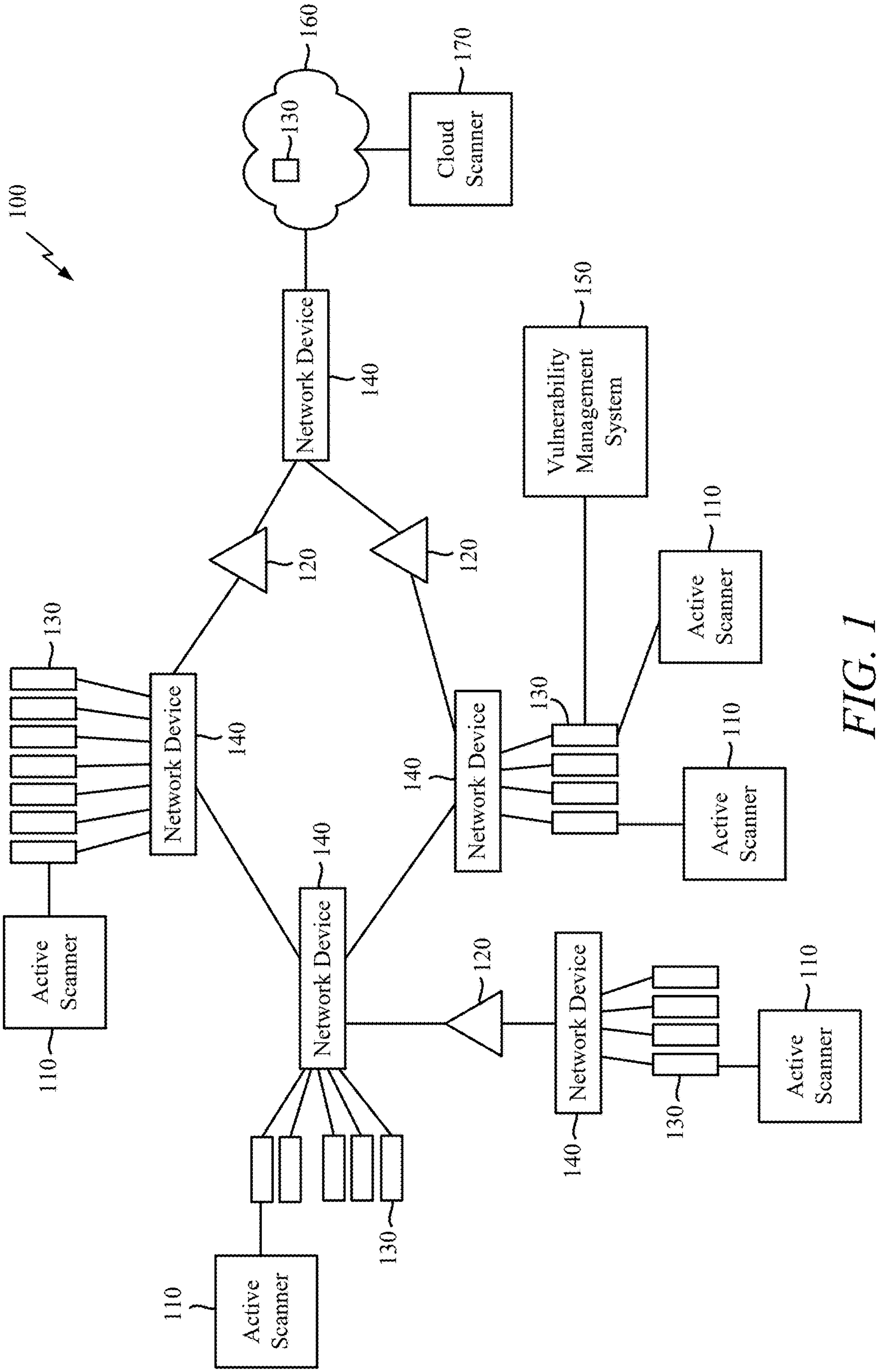
FIG. 1 illustrates an exemplary network having various assets that can be managed using a vulnerability management system, according to various aspects.

The accompanying drawings are presented to aid in the description of various aspects of the disclosure and are provided solely for illustration of the aspects and not limitation thereof.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes. Further, assets may encompass tangential network aspects such as policies, rules and so forth.

Assets may also be implemented within or as part of cloud network architecture (e.g., cloud assets may correspond to instances or virtual machines (VMs), particular devices or groups of devices, distributed resources across multiple devices and/or locations, etc.) By way of examples, cloud assets may include, but are not limited to, any of the following examples which are characterized with respect to AMAZON, GOOGLE and MICROSOFT cloud services (e.g., Amazin Web Services, Microsoft Azure, Google Cloud), e.g.:

'aws_athena_database'
'aws_db_instance'
'aws_db_snapshot'
'aws_dynamodb_table'
'aws_ecr_repository'
'aws_ecr_repository_policy'
'aws_ecs_cluster'
'aws_ecs_service'
'aws_eks_cluster'
'aws_elb'
'aws_emr_cluster'

'aws_instance'
'aws_nat_gateway'
'aws_rds_cluster'
'aws_rds_cluster_instance'
'aws_redshift_cluster'
'aws_s3_bucket'
'aws_s3_bucket_policy'
'azurerm_container_group'
'azurerm_container_registry'
'azurerm_kubernetes_cluster'
'azurerm_lb'
'azurerm_linux_virtual_machine'
'azurerm_mariadb_server'
'azurerm_mssql_server'
'azurerm_mssql_virtual_machine'
'azurerm_mysql_database'
'azurerm_mysql_server'
'azurerm_postgresql_database'
'azurerm_postgresql_server'
'azurerm_sql_database'
'azurerm_sql_server'
'azurerm_storage_container'
'azurerm_virtual_machine_scale_set'
'azurerm_windows_virtual_machine'
'google_bigquery_dataset'
'google_bigquery_table'
'google_compute_forwarding_rule'
'google_compute_global_forwarding_rule'
'google_compute_instance'
'google_container_cluster'
'google_container_registry'
'google_sql_database'
'google_sql_database_instance'
'google_storage_bucket'
'kubernetes_cluster'
'kubernetes_pod'

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. As used herein "credentialed" scans rely upon user credential(s) for authentication. Credentialed scans can perform a wider variety of checks than non-credentialed scans, which can result in more accurate scan results. Non-credentialed scans by contrast do not rely upon user credential(s) for authentication. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
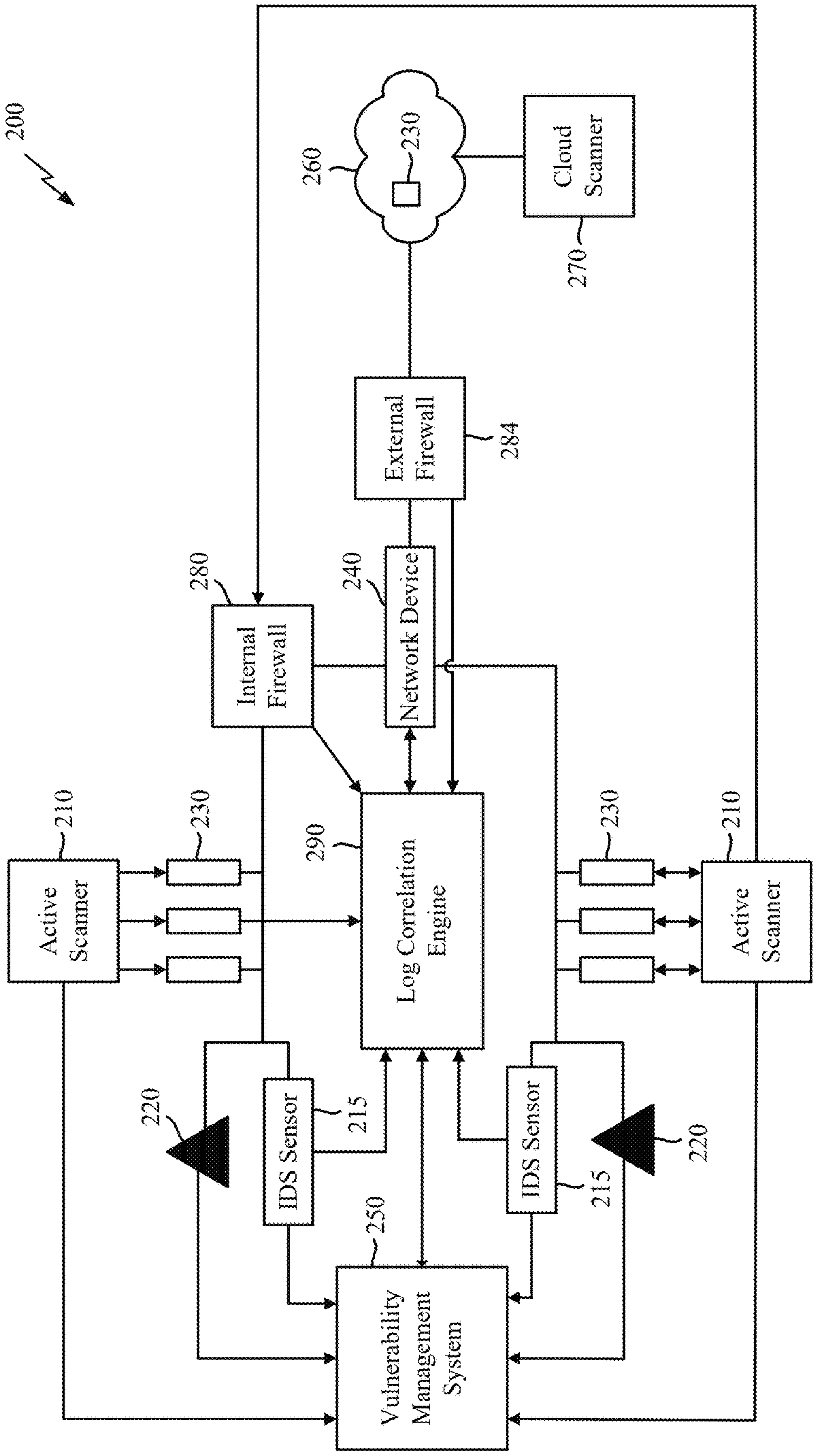
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term “remote network” as used herein may refer to the Internet, a partner network, a wide area network, a cloud infrastructure, and/or any other suitable external network. As such, the terms “remote network,” “external network,” “partner network,” and “Internet” may all be used interchangeably to suitably refer to one or more networks other than the networks 100, 200 that are managed using the vulnerability management systems 150, 250, while references to “the network” and/or “the internal network” may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

- If there is more than one matching solution in the solution list, remove all but one of those solutions.
- For solutions matching "Upgrade to <product> x.y.z" where x, y, and z are integers, select a single result with the highest x.y.z value (comparing against x first, then y, then z).
- For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o: microsoft: windows_vista:6.0: sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

WAS scans may take a relatively long time to perform, and many scans of redundant web pages or substantially redundant web pages may be performed. For example, a newly scanned web page may include only altered content (e.g., text, images, video, etc.) without any functional alterations, making that scan redundant.

When crawling a web application, a large number of web pages are discovered. Hence, deciding which of these web pages to audit via a security audit scan, and which will provide little to no benefit in auditing via the security audit scan, may help to reduce WAS scan times.

Figure 3:
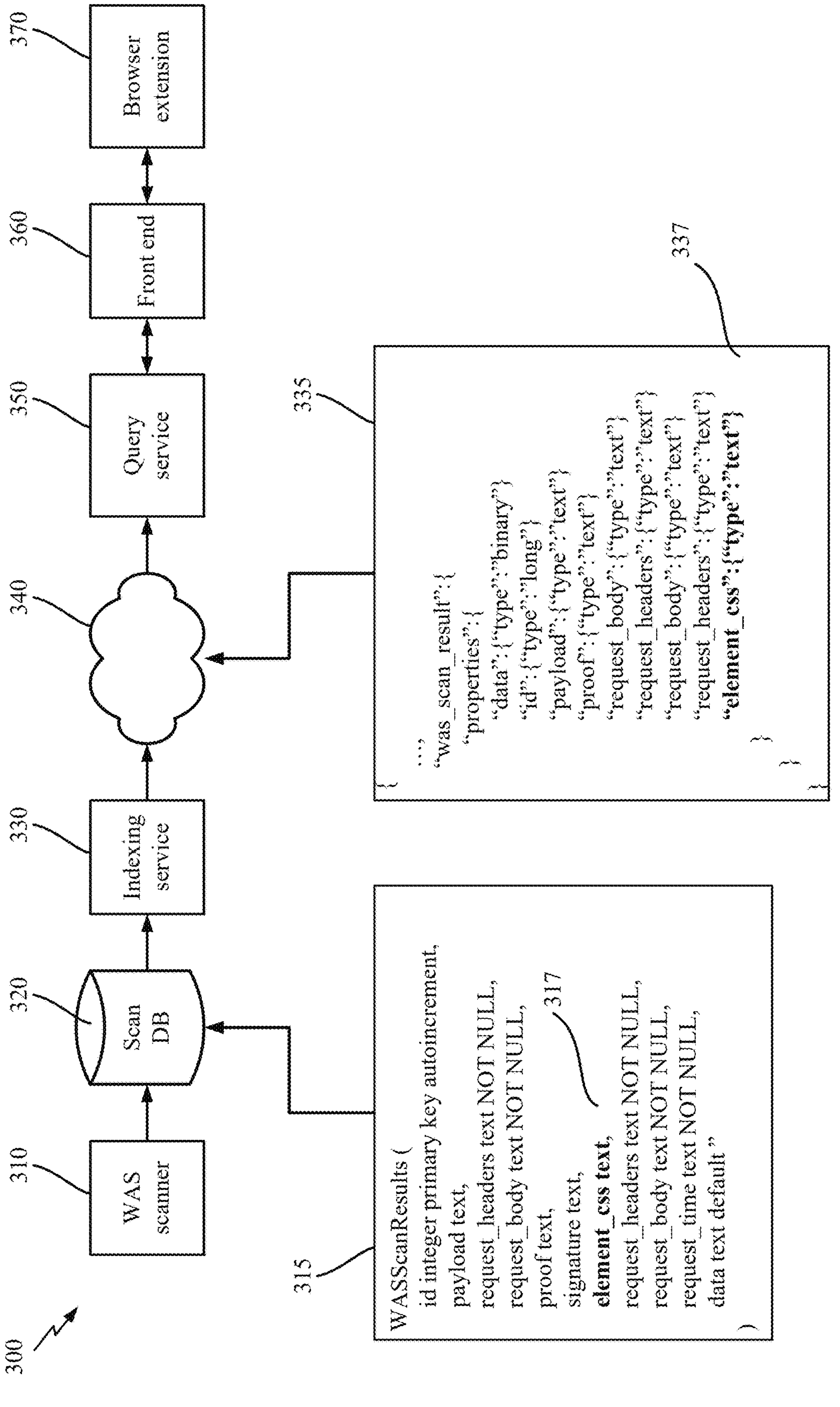
FIG. 3 illustrates a diagram of an example system suitable for interactive remediation of vulnerabilities of web applications based on scanning of web applications.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links back to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, it is seen the "was scan_results" 335 data includes the element selector data 337, which is denoted as "element_css": {"type":"text"}.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET/cans/{scanId}/hosts/{hostId}/plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

URL
Element selector
Plugin ID

The browser extension 370 may be configured to take the message passed from the front end 360, open the URL, and highlight and snap to the vulnerable element. In some aspects, the browser extension 370 may open the URL in a new tab of the browser.

Figure 4:
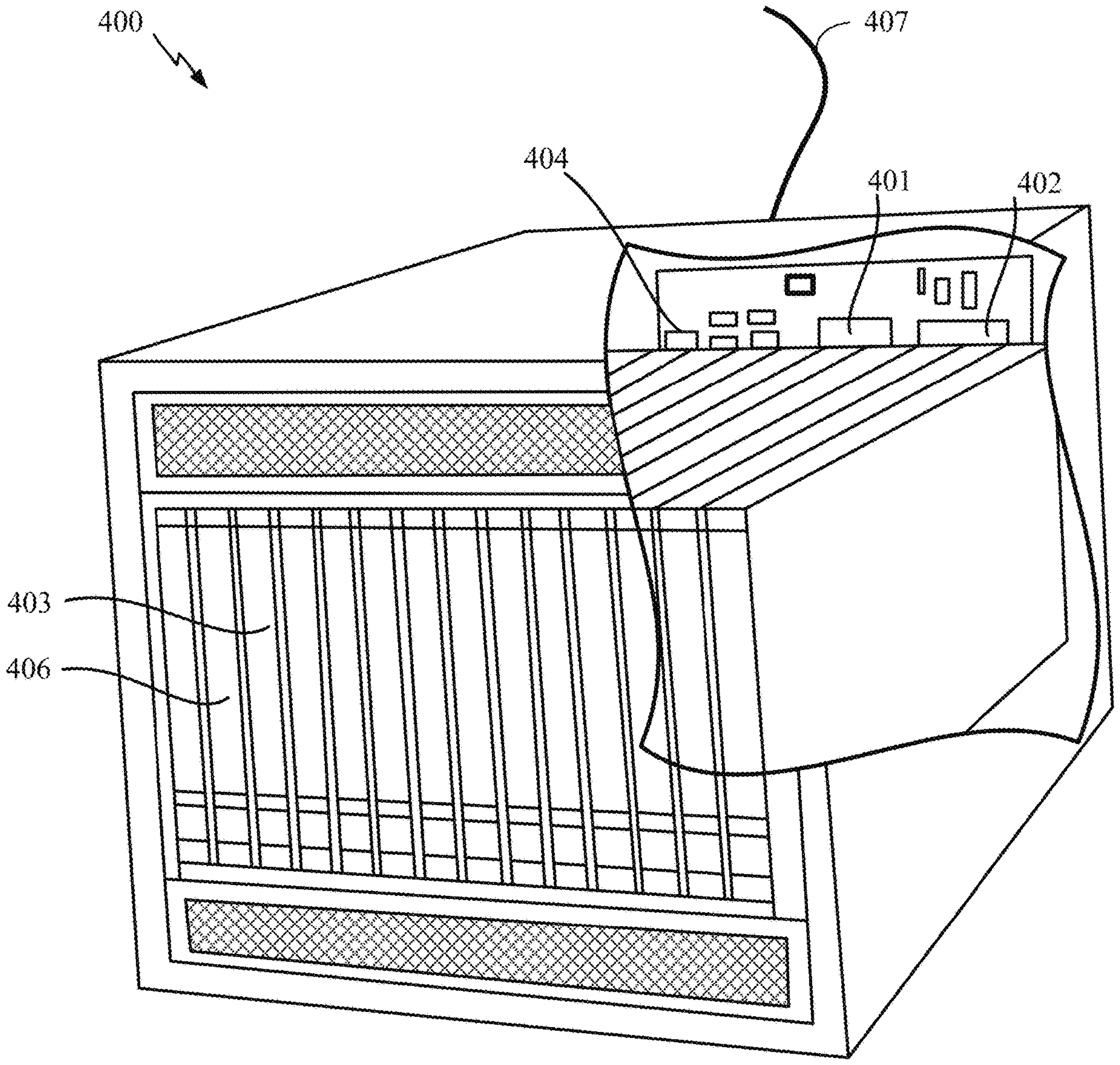
FIG. 4 illustrates a server, according to aspects of the disclosure.

The various embodiments may be implemented on any of a variety of commercially available server devices, such as server 400 illustrated in FIG. 4. In an example, the server 400 may correspond to one example configuration of a server on which a security auditing application may execute, which in certain implementations may be included as part of the vulnerability management system 150 of FIG. 1 or the vulnerability management system 250 of FIG. 2 or WAS scanner 300 of FIG. 3. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

Figure 5:
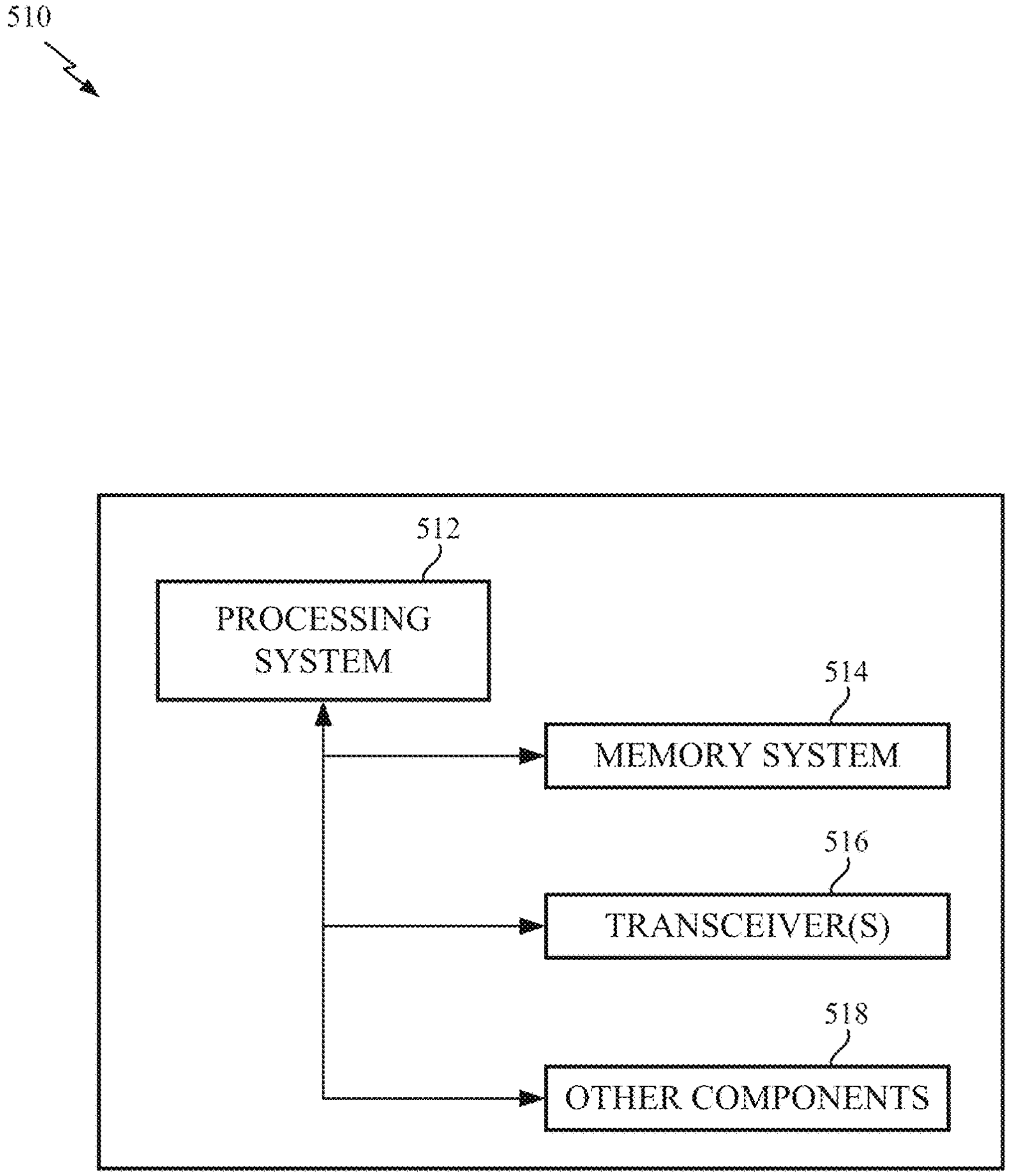
FIG. 5 generally illustrates a user equipment (UE) in accordance with aspects of the disclosure.

While FIG. 4 illustrates an example whereby a server-type apparatus 400 may implement various processes of the disclosure, in other aspects various aspects of the disclosure may execute on a user equipment (UE), such as UE 510 depicted in FIG. 5.

FIG. 5 generally illustrates a UE 510 in accordance with aspects of the disclosure. In some designs, UE 510 may correspond to any UE-type that is capable of executing the process(es) in accordance with aspects of the disclosure, including but not limited to a mobile phone or tablet computer, a laptop computer, a desktop computer, a wearable device (e.g., smart watch, etc.), and so on. The UE 510 depicted in FIG. 5 includes a processing system 512, a memory system 514, and at least one transceiver 516. The UE 510 may optionally include other components 518 (e.g., a graphics card, various communication ports, etc.).

Machine learning may be used to generate models that may be used to facilitate various aspects associated with processing of data. One specific application of machine learning relates to generation of measurement models for processing of reference signals for positioning (e.g., positioning reference signal (PRS)), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 6:
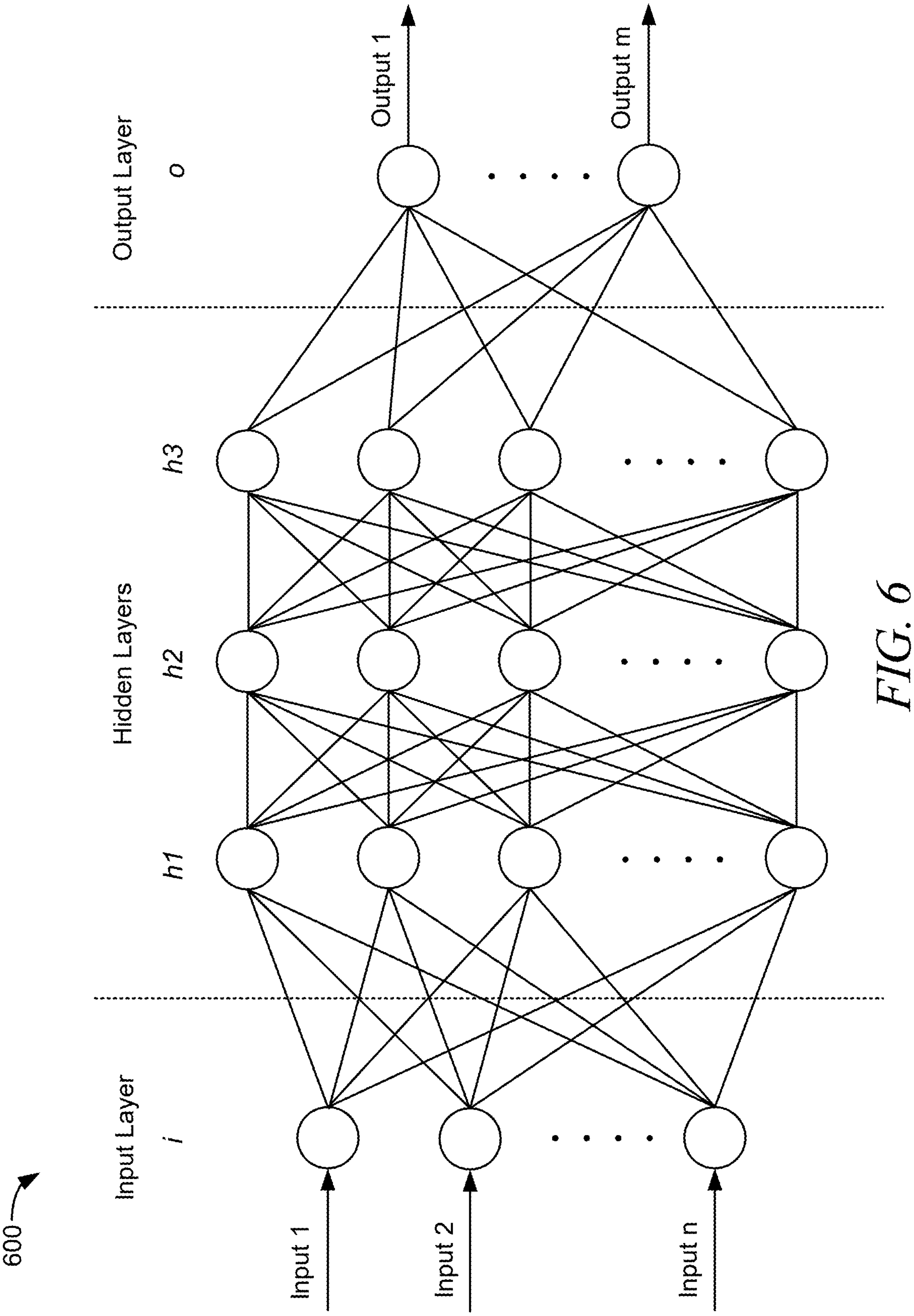
FIG. 6 illustrates an example neural network, according to aspects of the disclosure.

FIG. 6 illustrates an example neural network 600, according to aspects of the disclosure. The neural network 600 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

Figure 7:
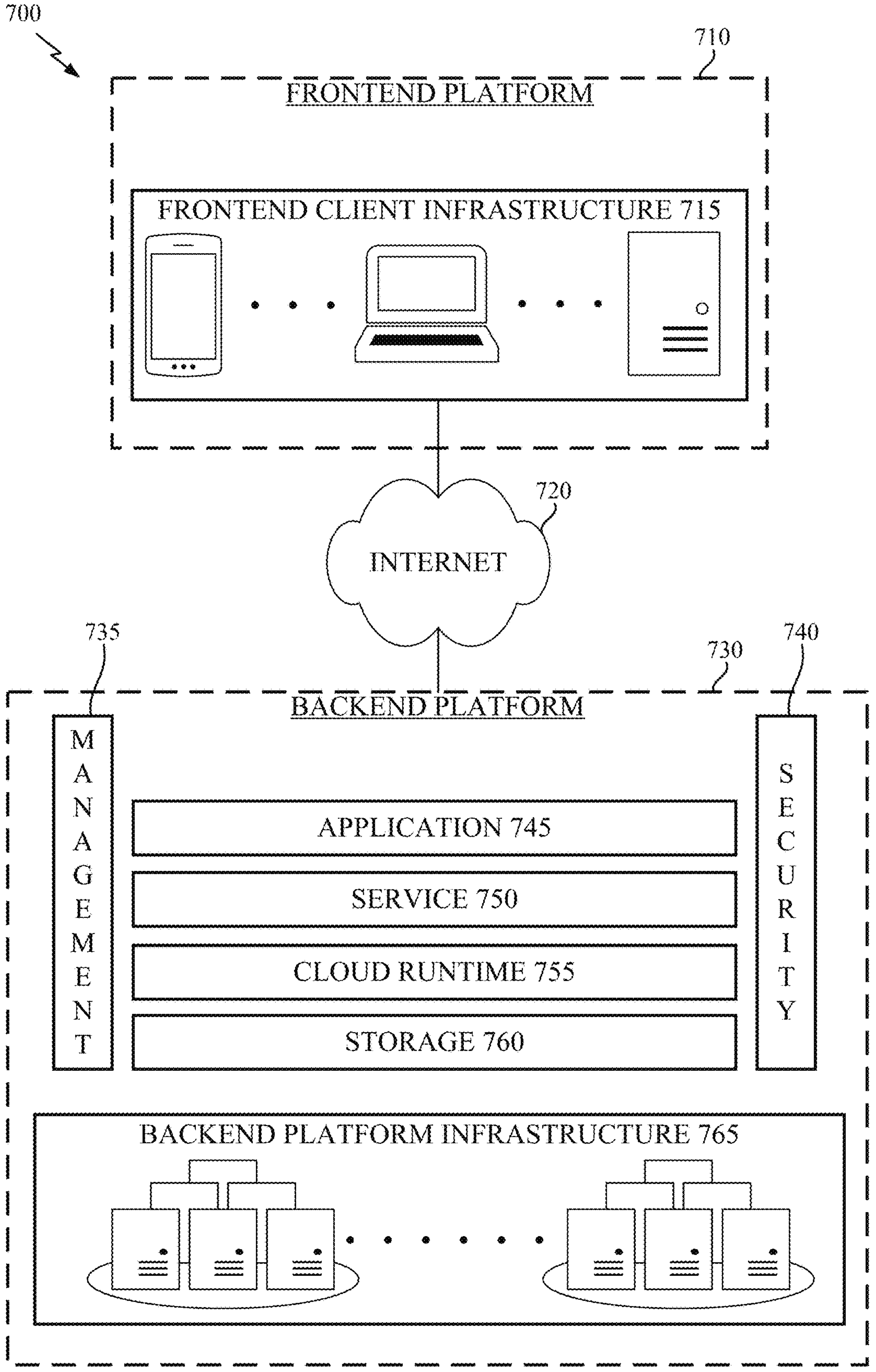
FIG. 7 illustrates cloud network architecture, in accordance with aspects of the disclosure.

FIG. 7 illustrates cloud network architecture 700, in accordance with aspects of the disclosure. The cloud network architecture 700 comprises a frontend platform 710, an Internet 720, and a backend platform 730. The frontend platform 710 comprises frontend client infrastructure 715, such as smartphones, laptop or desktop computers, and so on, for interfacing with clients (e.g., via web browsers, client applications, etc.). The backend platform 730 comprises a management function 735, a security function 740, an application function 745, a service function 750, a cloud runtime function 755, storage 760 and backend platform infrastructure 765 (e.g., a group of distributed and interconnected computing devices with shareable hardware and/or software resources that support distributed implementation of a set of cloud applications via a respective set of cloud resources).

Referring to FIG. 7, in cloud architecture, each of the components works together to create a cloud computing platform that provides users with on-demand access to resources and services. The backend platform 730 contains all the cloud computing resources, services 750, data storage 760, and applications 745 offered by a cloud service provider. A network, such as Internet 720, is used to connect the frontend platform 710 and backend cloud architecture components of the backend platform 730, facilitating data to be sent back and forth between them. When users interact with the frontend platform (or client-side interface), the user devices send queries to the backend platform 730 using middleware where the service model carries out the specific task or request.

The types of services available to use vary depending on the cloud-based delivery model or service model you have chosen. In some designs, there are three main cloud computing service models, e.g.:

- Infrastructure as a service (IaaS): This model provides on-demand access to cloud infrastructure, such as servers, storage, and networking. This eliminates the need to procure, manage, and maintain on-premises infrastructure.
- Platform as a service (PaaS): This model offers a computing platform with all the underlying infrastructure and software tools needed to develop, run, and manage applications.
- Software as a service (Saas): This model offers cloud-based applications that are delivered and maintained by the service provider, eliminating the need for end users to deploy software locally.

In some designs, cloud architecture may also be characterized in terms of cloud architecture layers, e.g.:

- Hardware: The servers, storage, network devices, and other hardware that power the cloud.
- Virtualization: An abstraction layer that creates a virtual representation of physical computing and storage resources. This allows multiple applications to use the same resources.
- Application and service: This layer coordinates and supports requests from the frontend user interface, offering different services based on the cloud service model, from resource allocation to application development tools to web-based applications.

In some designs, various types of cloud architecture may be implemented, e.g.:

- Public cloud architecture uses cloud computing resources and physical infrastructure that is owned and operated by a third-party cloud service provider. Public clouds enable you to scale resources easily without having to invest in your own hardware or software, but use multi-tenant architectures that serve other customers at the same time.
- Private cloud architecture refers to a dedicated cloud that is owned and managed by your organization. It is privately hosted on-premises in your own data center, providing more control over resources and more security over data and infrastructure. However, this architecture is considerably more expensive and requires more IT expertise to maintain.
- Hybrid cloud architecture uses both public and private cloud architecture to deliver a flexible mix of cloud services. A hybrid cloud allows you to migrate workloads between environments, allowing you to use the services that best suit your business demands and the workload. Hybrid cloud architectures are often the solution of choice for businesses that need control over their data but also want to take advantage of public cloud offerings.
- Multicloud architecture uses cloud services from multiple cloud providers. Multicloud environments are gaining popularity for their flexibility and ability to better match use cases to specific offerings, regardless of vendor.

In some designs, components of cloud architecture include:

- Virtualization: Clouds are built upon the virtualization of servers, storage, and networks. Virtualized resources are a software-based, or virtual, representation of a physical resource such as servers or storage. This abstraction layer facilitates multiple applications to utilize the same physical resources, thereby increasing the efficiency of servers, storage, and networking throughout the enterprise.
- Infrastructure: loud infrastructure includes all the components of traditional data centers including servers, persistent storage, and networking gear including routers and switches.
- Middleware: As in traditional data centers, these software components such as databases and communications applications enable networked computers, applications, and software to communicate with each other.
- Management: These tools enable continuous monitoring of a cloud environment's performance and capacity. IT teams can track usage, deploy new apps, integrate data, and ensure disaster recovery, all from a single console.
- Automation software: The delivery of critical IT services through automation and pre-defined policies can significantly ease IT workloads, streamline application delivery, and reduce costs. In cloud architecture, automation is used to easily scale up system resources to accommodate a spike in demand for compute power, deploy applications to meet fluctuating market demands, or ensure governance across a cloud environment.

Figure 8:
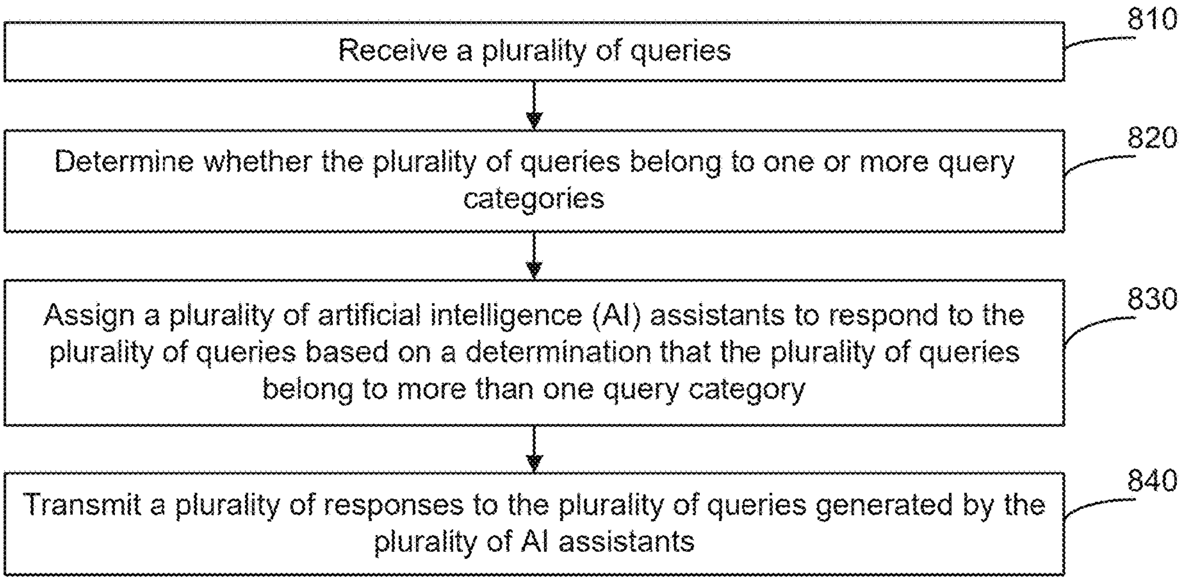
FIG. 8 illustrates a process, in accordance with aspects of the disclosure.

FIG. 8 illustrates a process 800, in accordance with aspects of the disclosure. The process 800 of FIG. 8 may be performed by a component, such as a network device 140, a network device 240, a query service 350, a server 400 or a UE 510.

Referring to FIG. 8, at 810, the component (e.g., network access ports 404, transceiver(s) 516, etc.) receives a plurality of queries.

Referring to FIG. 8, at 820, the component (e.g., processor(s) 401, processing system 512, etc.) determines whether the plurality of queries belong to one or more query categories.

Referring to FIG. 8, at 830, the component (e.g., processor(s) 401, processing system 512, etc.) assigns a plurality of artificial intelligence (AI) assistants to respond to the plurality of queries based on a determination that the plurality of queries belong to more than one query category.

Referring to FIG. 8, at 840, the component (e.g., network access ports 404, transceiver(s) 516, etc.) transmits a plurality of responses to the plurality of queries generated by the plurality of AI assistants.

Referring to FIG. 8, in some designs, the component further determines whether at least one of the plurality of queries is associated with a chat history, and further determines whether the chat history includes one or more historical queries belonging to at least one of the one or more query categories.

Referring to FIG. 8, in some designs, the component further determines whether the at least one of the plurality of queries is a follow-up query of the one or more historical queries in the chat history.

Referring to FIG. 8, in some designs, the component further appends the at least one of the plurality of queries to the chat history based on a determination that the at least one of the plurality of queries is a follow-up query of the one or more historical queries in the chat history.

Referring to FIG. 8, in some designs, the plurality of responses are based at least in part on the plurality of queries and the chat history.

Referring to FIG. 8, in some designs, the plurality of queries include a first query and a second query following the first query, wherein the plurality of AI assistants include a first AI assistant assigned to respond to the first query and a second AI assistant assigned to respond to the second query, and wherein the plurality of responses include a first response generated by the first AI assistant and a second response generated by the second AI assistant.

Referring to FIG. 8, in some designs, the second response is generated based at least in part on the second query and the first response.

Referring to FIG. 8, in some designs, the plurality of queries include a cybersecurity query.

Although FIG. 8 shows example blocks of process 800, in some implementations, process 800 may include additional blocks, fewer blocks, different blocks, or differently arranged blocks from those depicted in FIG. 8. Additionally, or alternatively, two or more of the blocks of process 800 may be performed in parallel, or performed in a sequence different from the sequence depicted in FIG. 8.

In order to respond to various types of queries, multiple AI assistants may be needed to provide optimal responses. In addition to providing multiple AI assistants, the following features may be desirable in a query response system for responding to user queries appropriately and efficiently as well as providing a smooth user experience: 1) a method of routing between these AI assistants; 2) a solution for keeping the routings between different AI assistants invisible for the user; and 3) support for use cases where a response provided by one AI assistant becomes an input to another AI assistant, together with one or more follow-up queries by the user.

For each given task within a multi-task process, an AI assistant with an appropriate LLM may be selected from a pool of AI assistants with various LLMs according to aspects of the disclosure. In some aspects, a single interface (e.g., a user device with a keyboard, keypad, microphone, speaker, touchscreen, display, etc.) may be provided for a user who may be interacting with multiple AI assistants such as chatbots or conversational agents. In some aspects, the process of switching between the appropriate AI assistants for responding to various queries may be invisible to the user, thus obviating the need for the user to specify the category of each query and simplifying the query process on the part of the user.

In some aspects, the user may be allowed to ask one or more follow-up questions after the first question. In some situations, the user may ask various follow-up questions in a conversation even if some or all of the follow-up questions are not intended for the same AI assistant. For example, the user may ask, "What is my most prevalent vulnerability?" and receive a response from a first AI assistant, "CVE-1999-0524." This may result in a follow-up question, for example, "Can you explain it?" The response from a second AI assistant may include a description of the vulnerability, stating that it relates to "ICMP" and "Red Hat," for example. Then the user may ask another follow-up question, for example, "What is ICMP?" The second AI assistant may respond, "ICMP is Internet Control Message Protocol." In some situations, however, a response to a query may depend at least in part on user-specific live data that may not be part of an LLM during its training.

Figure 9:
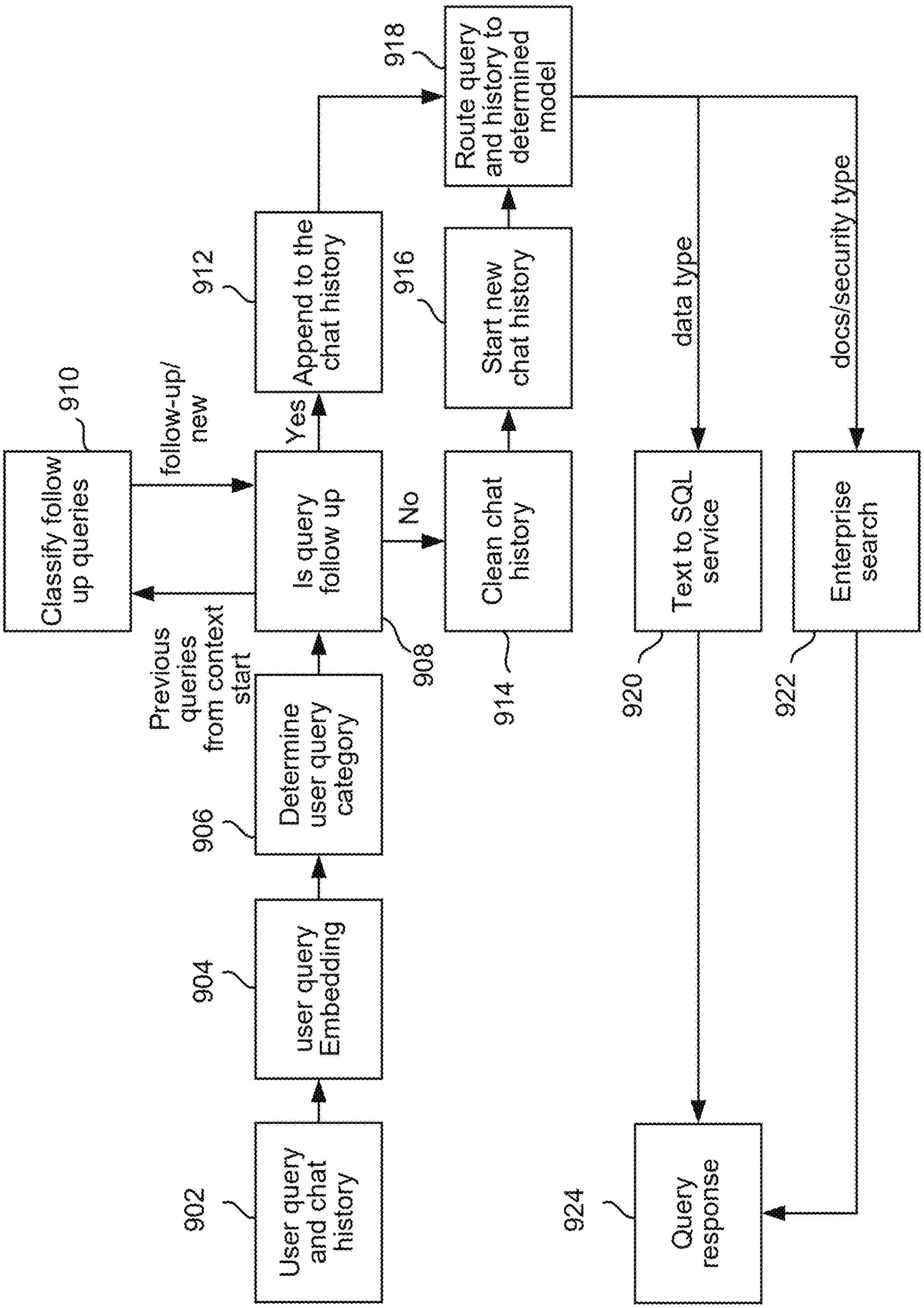
FIG. 9 illustrates an example of a multi-step query process, according to aspects of the disclosure.

FIG. 9 illustrates an example of a multi-step query process, according to aspects of the disclosure. In the example illustrates in FIG. 9, a user query and chat history may be provided in block 902. Embedding of the user query may be performed in block 904. As used herein, an embedding of a query is a numerical representation of the query by translating the words of the query into a vector of numbers that captures the semantic meaning of the query, thus allowing a computer to understand the intent behind the words and compare it to other queries based on their meanings. The category to which the user query belongs may be determined based on its embedding in block 906. After the category of the user query is determined, a determination may be made as to whether the user query is a follow-up query in block 908.

If it is determined that the user query is a follow-up query, then the follow-up query may be classified based on one or more previous queries from the context of the user query in block 910. If the user query is a follow-up query, then the follow-up query may be appended to an existing chat history (if available) in block 912. If the user query is not a follow-up query, then the existing chat history (if any) may be cleaned in block 914, and a new chat history may be started with the user query in block 916.

In some aspects, after the user query is appended to the existing chat history if it is a follow-up query in block 912, or after a new chat history is started if the user query is not a follow-up query in block 916, a determination may be made as to which LLM would be the appropriate model for responding to the user query, and the user query and its associated chat history may be routed to the appropriate LLM in block 918.

In the example shown in FIG. 9, a determination is made as to whether the user query is a data-related question or a security-related question. In this example, a data-related question may be routed to a first AI assistant in block 920 for answering the data-related question, whereas a security-related question may be routed to a second AI assistant in block 922 for answering the security-related question.

In some aspects, a query response may be formulated in block 924 based on the answers to data-related and security-related questions provided by the first and second AI assistants in blocks 920 and 922, respectively. In some implementations, both the first and second AI assistants in blocks 920 and 922 may be part of external systems. In some implementations, one or more additional AI assistants may be provided to respond to additional user queries (whether they are new queries or follow-up queries), the subject matter of which may be relevant to those additional AI assistants.

In some aspects, a classifier may be constructed to provide sample queries for each supported user category. For example, a linear support vector machine (SVM) classifier may be constructed to accept embeddings as inputs. Each of the categories may have a unique pattern of distribution of likelihood of occurrence. In some aspects, the category classifier may be trained by using a machine learning (ML) embedding classifier, or by using an LLM-based system to classify the category of user queries.

Figure 10:
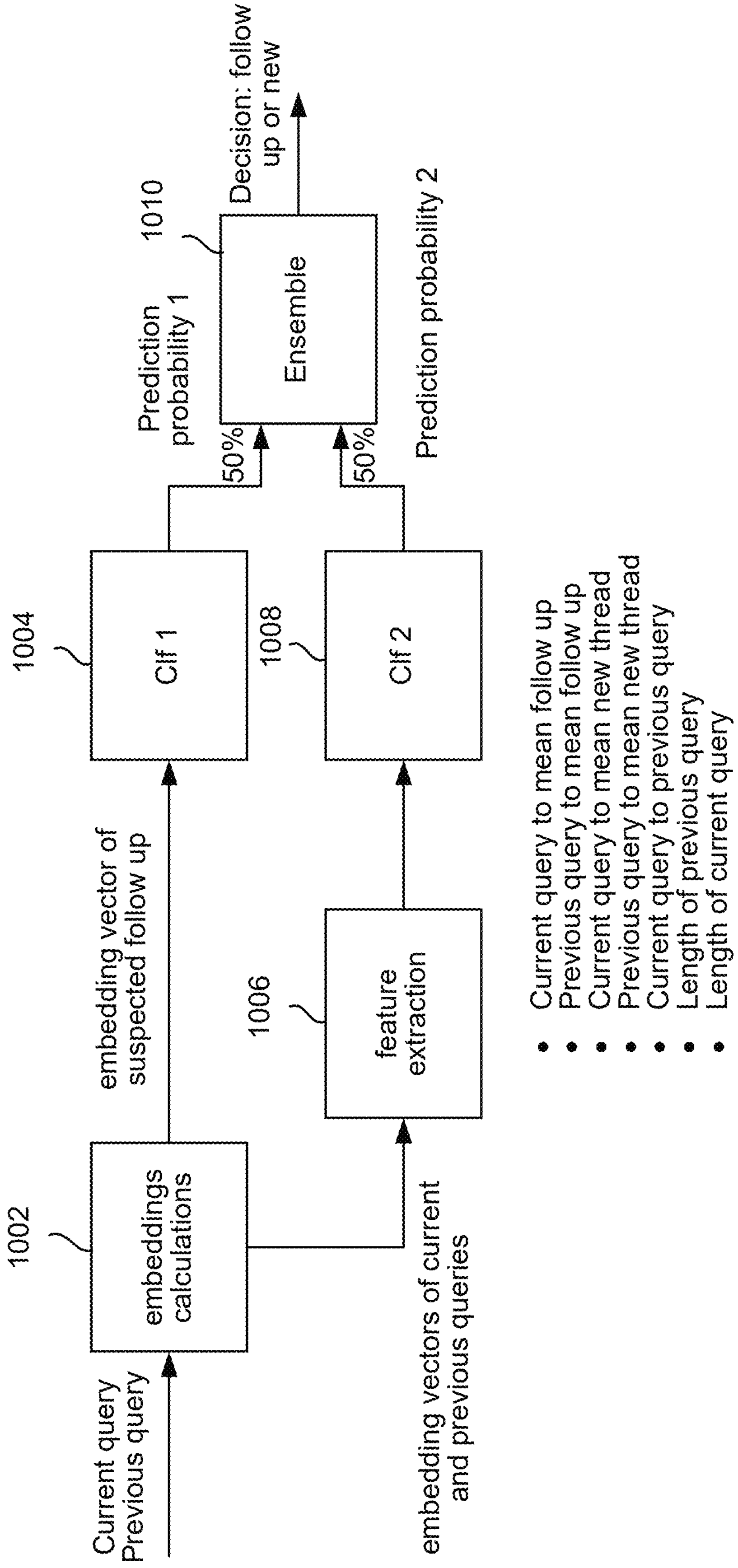
FIG. 10 illustrates an example of a classifier for making a decision on two queries, where the second query is a follow-up to the first query, according to aspects of the disclosure.

FIG. 10 illustrates an example of a classifier for making a decision on two queries, where the second query is a follow-up to the first query, according to aspects of the disclosure. In the example illustrated in FIG. 10, a current query and a previous query are received as inputs to an embeddings and calculations block 1002. In some aspects, an embedding vector of a suspected follow-up query may be generated and sent to a first classifier 1004 (denoted as "Clf 1"). In some aspects, embedding vectors of the current and previous queries also may be generated, and feature extraction may be performed on the embedding vectors of the current and previous queries in a feature extraction block 1006. In some aspects, extracted features of the current and previous queries generated by the feature extraction block 1006 may be sent to a second classifier 1008 (denoted as "Clf 2").

In some aspects, the first classifier 1004 may generate a first prediction probability (denoted as "Prediction probability 1") whereas the second classifier 1008 may generate a second prediction probability (denoted as "Prediction probability 2"). In some aspects, the first prediction probability generated by the first classifier 1004 and the second prediction probability generated by the second classifier 1008 may be sent to an ensemble 1010, which may make a decision as to whether the current query is a follow-up of the previous query or a new query (or the start of a new thread). In the example shown in FIG. 10, the first and second prediction probabilities generated by the first and second classifiers 1004 and 1008, respectively, are weighted equally (i.e., 50% each) as inputs to the ensemble 1010. In a different implementation, the prediction probabilities from the different classifiers may not be weighted equally.

In some scenarios, while the first classifier may work with raw embeddings, the problem of deciding whether a current query is a follow-up to the previous query may be challenging, as it may not always be a clear-cut case as to whether the current query is a follow-up query or the start of a new thread. The fact that a second query immediately follows a first query in a temporal sequence does not mean that the second query is necessarily a follow-up to the first query. In some aspects, some additional context may be provided to the classifier to help the classifier determine whether a second query is a follow-up to the first query.

In some aspects, an ensemble classifier may use features derived from embeddings of queries to classify two input questions if one is a follow-up to the other with a high degree of accuracy. For example, to build an ensemble classifier using derived features for classifying follow-up questions and new-thread questions, the following parameters may be computed:

1) df=the average embedding for follow-up questions;
2) dn=the average embedding for new thread questions;
3) the distances from test questions (previous question and the current question which is a suspected follow-up question) to df and dn which resulted in four distance values: previous_to_df, previous_to_dn, current_to_df, current_to_dn;
4) The distance between the current and the previous questions: current_to_previous;
5) The length of both the current and the previous questions: len_current, len_previous.

In this example, seven additional parameters (df, dn, previous_to_df, previous_to_dn, current_to_df, current_to_dn, current_to_previous, len_current, len_previous) and their embeddings may be determined. In some aspects, by using an ensemble model (e.g., the ensemble model as shown in FIG. 10 and described above) with two classifiers, a high degree of prediction accuracy, precision, recall and speed may be achieved.

In some aspects, interactive steps may be performed by the classifiers and AI assistants (e.g., chatbots) to generate responses to queries which may include multiple related or unrelated questions. For example, the following interactive steps may be performed:

Step 1: A user provides a query (e.g., "What is my most prevalent vulnerability").

Step 2: The query is converted to its vector representation, also called an embedding. For example, a query may be represented by a vector: [0.00729, 0.03644, −0.00787, −0.03459, 0.03081, 0.01746, 0.00427, −0.01141, 0.05167, 0.04242, 0.08039, −0.00021, −0.02643, −0.04472, 0.03735, −0.04907, 0.04172, 0.01363, 0.00550, 0.00747].

Step 3: This vector is classified and provided as an input to an AI assistant.

Step 4: Once the category of the user query is determined, the user query is evaluated to determine whether it is a follow-up query.

Step 5a: If it is determined that the user query is a new query, the chat history may be cleared, and the user query with a clean chat history may be routed to the AI assistant (e.g., a chatbot) as determined in Step 3.

Step 5b: If it is determined that the user query is a follow-up query, the history from the previous steps may be maintained. The user query with a non-empty chat history may be routed to the AI assistant as determined in Step 3. The user query (i.e., a follow-up query) may be appended to the non-empty chat history as the most recent message.

Step 6: The AI assistant may provide a response that may be transmitted or presented (e.g., displayed) to the user.

In some aspects, the entire process does not need any human input except the entry of a query by a user. For example, the user need not specify the category of the query or inform the system as to whether the query is a follow-up to a previous query.

Figure 11:
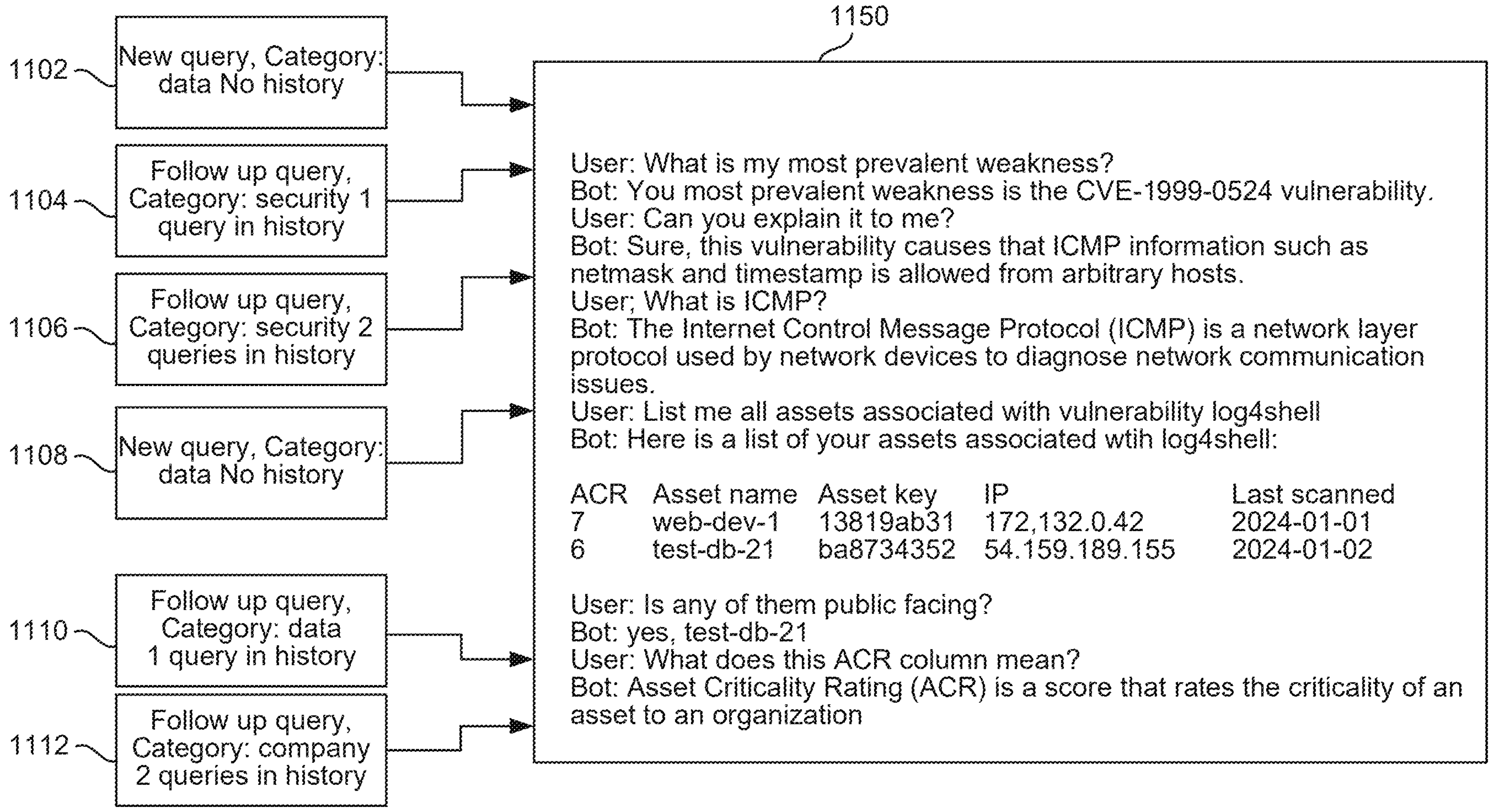
FIG. 11 illustrates a working example of query routing, according to aspects of the disclosure.

FIG. 11 illustrates a working example of query routing, according to aspects of the disclosure. As illustrated in FIG. 11, the user queries and the responses provided by one or more AI assistants (e.g., chatbots) may be presented on a screen 1150. For example, the user may ask a first question, "What is my most prevalent weakness?" That question may be determined to be a new query and categorized as a data question with no chat history, as shown in block 1102. The AI assistant may respond, "Your most prevalent weakness is the CVE-1999-0524 vulnerability," as displayed on the screen 1150. Then the user may ask a second question, "Can you explain it to me?" That question may be determined to be a follow-up query and categorized as a security question with one query in chat history, as shown in block 1104. The AI assistant may respond, "Sure, this vulnerability causes that ICMP information such as netmask and timestamp is allowed from arbitrary hosts," as displayed on the screen 1150.

Then the user may ask a third question, "What is ICMP?" That question may be determined to be a follow-up query and categorized as a security question with two queries in chat history, as shown in block 1106. The AI assistant may respond, "The Internet Control Message Protocol (ICMP) is a network layer protocol used by network devices to diagnose network communication issues," as displayed on the screen 1150.

Then the user may make a request, "List me all assets associated with vulnerability log4shell." That request may be determined to be a new query and categorized as a data question with no chat history, as shown in block 1108. The AI assistant may display a list of ACRs, asset names, asset keys, IP addresses, and last scanned dates on the screen 1150.

After the user sees the list, the user may ask, "Is any of them public facing?" That question may be determined to be a follow-up query and categorized as a data question with one query in chat history, as shown in block 1110. The AI assistant may respond, "Yes, test-db-21," as displayed on the screen 1150.

Then the user may ask, "What does this ACR column mean?" That question may be determined to be a follow-up query and categorized as a company question with two queries in chat history, as shown in block 1112. The AI assistant may respond, "Asset Criticality Rating (ACR) is a score that rates the criticality of an asset to an organization," as displayed on the screen 1150.

In the example shown in FIG. 11, the category of each query, whether the query is a new query or a follow-up query, whether there is a chat history associated with the query, and how many previous queries (if any) in the chat history, may be determined by using the classification schemes described above with references to FIGS. 9 and 10.

In the example illustrated in FIG. 11, the messages may be routed between the user and chatbots that are capable of supporting three distinct categories of queries, namely, data (for customer-specific data questions), security (for generic security questions), and company (for public company documentation). In some aspects, one or more additional chatbots may be utilized to answer questions that span across multiple categories. In some implementations, a user interface other than or in addition to a screen display may be used for interactions between the user and the chatbots. For example, an interactive voice system with a microphone and a speaker may be used.

In some aspects, multiple AI assistants (e.g., chatbots, virtual agents, conversational agents, etc.) with multiple LLM systems may be applied to scenarios with multiple threads where one LLM system may provide its chat history to another. In some aspects, a classification scheme may be provided to determine whether a given query is a follow-up to another or a new one. In some aspects, ensemble classifiers instead of LLMs may be used for categorizing user queries to lower the cost, to improve the response time, and to offer better response accuracy.

In the example described above with reference to FIG. 11, two of the queries may be security-related follow-up queries (e.g., as shown in blocks 1104 and 1106). Although these queries may be applicable in the context of cybersecurity, query response schemes according to aspects of the disclosure may be applicable in various other contexts.

In the context of cybersecurity, there may be a requirement that customers have access to data stored about them (and/or for them) in internal databases. It may be cumbersome, however, to query customer data that may come from various company lifecycles for various reasons (e.g., some customer data may be very old or stale, or acquired through a strategic acquisition). Thus, for user queries which include at least some cybersecurity-related questions, one or more AI assistants that are suited for answering cybersecurity-related questions may be utilized in addition to AI assistant(s) using generic LLMs.

In the detailed description above, it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method, performed by a component, comprising: receiving a plurality of queries; determining whether the plurality of queries belong to one or more query categories; assigning a plurality of artificial intelligence (AI) assistants to respond to the plurality of queries based on a determination that the plurality of queries belong to more than one query category; and transmitting a plurality of responses to the plurality of queries generated by the plurality of AI assistants.

Clause 2. The method of clause 1, further comprising: determining whether at least one of the plurality of queries is associated with a chat history; and determining whether the chat history includes one or more historical queries belonging to at least one of the one or more query categories.

Clause 3. The method of clause 2, wherein determining whether the at least one of the plurality of queries is associated with the chat history comprises: determining whether the at least one of the plurality of queries is a follow-up query of the one or more historical queries in the chat history.

Clause 4. The method of clause 3, further comprising: appending the at least one of the plurality of queries to the chat history based on a determination that the at least one of the plurality of queries is a follow-up query of the one or more historical queries in the chat history.

Clause 5. The method of any of clauses 2 to 4, wherein the plurality of responses are based at least in part on the plurality of queries and the chat history.

Clause 6. The method of any of clauses 1 to 5, wherein the plurality of queries include a first query and a second query following the first query, wherein the plurality of AI assistants include a first AI assistant assigned to respond to the first query and a second AI assistant assigned to respond to the second query, and wherein the plurality of responses include a first response generated by the first AI assistant and a second response generated by the second AI assistant.

Clause 7. The method of clause 6, wherein the second response is generated based at least in part on the second query and the first response.

Clause 8. The method of any of clauses 1 to 7, wherein the plurality of queries include a cybersecurity query.

Clause 9. A component, comprising: one or more memories; and one or more processors communicatively coupled to the one or more memories, the one or more processors, either alone or in combination, configured to: receive a plurality of queries; determine whether the plurality of queries belong to one or more query categories; assign a plurality of artificial intelligence (AI) assistants to respond to the plurality of queries based on a determination that the plurality of queries belong to more than one query category; and transmit a plurality of responses to the plurality of queries generated by the plurality of AI assistants.

Clause 10. The component of clause 9, wherein the one or more processors, either alone or in combination, are further configured to: determine whether at least one of the plurality of queries is associated with a chat history; and determine whether the chat history includes one or more historical queries belonging to at least one of the one or more query categories.

Clause 11. The component of clause 10, wherein the one or more processors configured to determine whether the at least one of the plurality of queries is associated with the chat history comprise the one or more processors, either alone or in combination, configured to: determine whether the at least one of the plurality of queries is a follow-up query of the one or more historical queries in the chat history.

Clause 12. The component of clause 11, wherein the one or more processors, either alone or in combination, are further configured to: append the at least one of the plurality of queries to the chat history based on a determination that the at least one of the plurality of queries is a follow-up query of the one or more historical queries in the chat history.

Clause 13. The component of any of clauses 10 to 12, wherein the plurality of responses are based at least in part on the plurality of queries and the chat history.

Clause 14. The component of any of clauses 9 to 13, wherein the plurality of queries include a first query and a second query following the first query, wherein the plurality of AI assistants include a first AI assistant assigned to respond to the first query and a second AI assistant assigned to respond to the second query, and wherein the plurality of responses include a first response generated by the first AI assistant and a second response generated by the second AI assistant.

Clause 15. The component of clause 14, wherein the second response is generated based at least in part on the second query and the first response.

Clause 16. The component of any of clauses 9 to 15, wherein the plurality of queries include a cybersecurity query.

Clause 17. A non-transitory computer-readable medium stores computer-executable instructions that, when executed by a component, cause the component to: receive a plurality of queries; determine whether the plurality of queries belong to one or more query categories; assign a plurality of artificial intelligence (AI) assistants to respond to the plurality of queries based on a determination that the plurality of queries belong to more than one query category; and transmit a plurality of responses to the plurality of queries generated by the plurality of AI assistants.

Clause 18. The non-transitory computer-readable medium of clause 17, further comprising computer-executable instructions that, when executed by the component, cause the component to: determine whether at least one of the plurality of queries is associated with a chat history; and determine whether the chat history includes one or more historical queries belonging to at least one of the one or more query categories.

Clause 19. The non-transitory computer-readable medium of clause 18, wherein the computer-executable instructions that, when executed by the component, cause the component to determine whether the at least one of the plurality of queries is associated with the chat history comprise computer-executable instructions that, when executed by the component, cause the component to: determine whether the at least one of the plurality of queries is a follow-up query of the one or more historical queries in the chat history.

Clause 20. The non-transitory computer-readable medium of clause 19, further comprising computer-executable instructions that, when executed by the component, cause the component to: append the at least one of the plurality of queries to the chat history based on a determination that the at least one of the plurality of queries is a follow-up query of the one or more historical queries in the chat history.

Clause 21. The non-transitory computer-readable medium of any of clauses 18 to 20, wherein the plurality of responses are based at least in part on the plurality of queries and the chat history.

Clause 22. The non-transitory computer-readable medium of any of clauses 17 to 21, wherein the plurality of queries include a first query and a second query following the first query, wherein the plurality of AI assistants include a first AI assistant assigned to respond to the first query and a second AI assistant assigned to respond to the second query, and wherein the plurality of responses include a first response generated by the first AI assistant and a second response generated by the second AI assistant.

Clause 23. The non-transitory computer-readable medium of clause 22, wherein the second response is generated based at least in part on the second query and the first response.

Clause 24. The non-transitory computer-readable medium of any of clauses 17 to 23, wherein the plurality of queries include a cybersecurity query.

Clause 25. A component, comprising: means for receiving a plurality of queries; means for determining whether the plurality of queries belong to one or more query categories; means for assigning a plurality of artificial intelligence (AI) assistants to respond to the plurality of queries based on a determination that the plurality of queries belong to more than one query category; and means for transmitting a plurality of responses to the plurality of queries generated by the plurality of AI assistants.

Clause 26. The component of clause 25, further comprising: means for determining whether at least one of the plurality of queries is associated with a chat history; and means for determining whether the chat history includes one or more historical queries belonging to at least one of the one or more query categories.

Clause 27. The component of clause 26, wherein the means for determining whether the at least one of the plurality of queries is associated with the chat history comprises: means for determining whether the at least one of the plurality of queries is a follow-up query of the one or more historical queries in the chat history.

Clause 28. The component of clause 27, further comprising: means for appending the at least one of the plurality of queries to the chat history based on a determination that the at least one of the plurality of queries is a follow-up query of the one or more historical queries in the chat history.

Clause 29. The component of any of clauses 26 to 28, wherein the plurality of responses are based at least in part on the plurality of queries and the chat history.

Clause 30. The component of any of clauses 25 to 29, wherein the plurality of queries include a first query and a second query following the first query, wherein the plurality of AI assistants include a first AI assistant assigned to respond to the first query and a second AI assistant assigned to respond to the second query, and wherein the plurality of responses include a first response generated by the first AI assistant and a second response generated by the second AI assistant.

Clause 31. The component of clause 30, wherein the second response is generated based at least in part on the second query and the first response.

Clause 32. The component of any of clauses 25 to 31, wherein the plurality of queries include a cybersecurity query.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line, or wireless technologies such as infrared, radio, and microwave, then the coaxial cable, fiber optic cable, twisted pair, digital subscriber line, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method, performed by a component, comprising:
- receiving a plurality of queries including a cybersecurity query;
- determining whether each query of the plurality of queries belongs to a data-related query category or a cybersecurity-related query category;
- assigning a plurality of artificial intelligence (AI) assistants to respond to the plurality of queries based on a determination that the plurality of queries belong to more than one query category, wherein the AI assistants include a first AI assistant to respond to a query in the data-related query category and a second AI assistant to respond to the cybersecurity query in the cybersecurity-related query category;
- determining whether a current query of the plurality of queries is a follow-up query to a previous query by:
  - generating a first embedding vector of the current query;
  - providing the first embedding vector to a first classifier to generate a first prediction probability that the current query is a follow-up query of the previous query;
  - performing feature extraction on the first embedding vector and a second embedding vector of the previous query to generate extracted features;
  - providing the extracted features to a second classifier to generate a second prediction probability that the current query is a follow-up query of the previous query after the feature extraction; and
  - determining that the current query is the follow-up query to the previous query using an ensemble based on the first prediction probability and the second prediction probability;
- routing the follow-up query to one of the plurality of AI assistants; and
- transmitting a plurality of responses to the plurality of queries generated by the plurality of AI assistants.

2. The method of claim 1, further comprising:
- determining whether at least one of the plurality of queries is associated with a chat history; and
- determining whether the chat history includes one or more historical queries belonging to at least one query category.

3. The method of claim 2, wherein determining whether the at least one of the plurality of queries is associated with the chat history comprises:
- determining whether the at least one of the plurality of queries is a follow-up query of the one or more historical queries in the chat history.

4. The method of claim 3, further comprising:
- appending the at least one of the plurality of queries to the chat history based on a determination that the at least one of the plurality of queries is a follow-up query of the one or more historical queries in the chat history.

5. The method of claim 2, wherein the plurality of responses are based at least in part on the plurality of queries and the chat history.

6. The method of claim 1, wherein the plurality of queries include a first query and a second query following the first query, wherein the plurality of AI assistants include the first AI assistant assigned to respond to the first query and the second AI assistant assigned to respond to the second query, and wherein the plurality of responses include a first response generated by the first AI assistant and a second response generated by the second AI assistant.

7. The method of claim 6, wherein the second response is generated based at least in part on the second query and the first response.

8. A component, comprising:
- one or more memories; and
- one or more processors communicatively coupled to the one or more memories, the one or more processors, either alone or in combination, configured to:
  - receive a plurality of queries including a cybersecurity query;
  - determine whether each query of the plurality of queries belongs to a data-related query category or a cybersecurity-related query category;
  - assign a plurality of artificial intelligence (AI) assistants to respond to the plurality of queries based on a determination that the plurality of queries belong to more than one query category, wherein the AI assistants include a first AI assistant to respond to a query in the data-related query category and a second AI assistant to respond to the cybersecurity query in the cybersecurity-related query category;
  - determine whether a current query of the plurality of queries is a follow-up query to a previous query by:
    - generating a first embedding vector of the current query;
    - providing the first embedding vector to a first classifier to generate a first prediction probability that the current query is a follow-up query of the previous query;
    - performing feature extraction on the first embedding vector and a second embedding vector of the previous query to generate extracted features;
    - providing the extracted features to a second classifier to generate a second prediction probability that the current query is a follow-up query of the previous query after the feature extraction; and
    - determining that the current query is the follow-up query to the previous query using an ensemble based on the first prediction probability and the second prediction probability;

route the follow-up query to one of the plurality of AI assistants; and transmit a plurality of responses to the plurality of queries generated by the plurality of AI assistants.

9. The component of claim 8, wherein the one or more processors, either alone or in combination, are further configured to:

determine whether at least one of the plurality of queries is associated with a chat history; and determine whether the chat history includes one or more historical queries belonging to at least one query category.

10. The component of claim 9, wherein the one or more processors configured to determine whether the at least one of the plurality of queries is associated with the chat history comprise the one or more processors, either alone or in combination, configured to:

determine whether the at least one of the plurality of queries is a follow-up query of the one or more historical queries in the chat history.

11. The component of claim 10, wherein the one or more processors, either alone or in combination, are further configured to:

append the at least one of the plurality of queries to the chat history based on a determination that the at least one of the plurality of queries is a follow-up query of the one or more historical queries in the chat history.

12. The component of claim 9, wherein the plurality of responses are based at least in part on the plurality of queries and the chat history.

13. The component of claim 8, wherein the plurality of queries include a first query and a second query following the first query, wherein the plurality of AI assistants include the first AI assistant assigned to respond to the first query and the second AI assistant assigned to respond to the second query, and wherein the plurality of responses include a first response generated by the first AI assistant and a second response generated by the second AI assistant.

14. The component of claim 13, wherein the second response is generated based at least in part on the second query and the first response.

15. A non-transitory computer-readable medium storing computer-executable instructions that, when executed by a component, cause the component to:

receive a plurality of queries including a cybersecurity query;

determine whether each query of the plurality of queries belongs to a data-related query category or a cybersecurity-related query category;

assign a plurality of artificial intelligence (AI) assistants to respond to the plurality of queries based on a determination that the plurality of queries belong to more than one query category, wherein the AI assistants include a first AI assistant to respond to a query in the data-related query category and a second AI assistant to respond to the cybersecurity query in the cybersecurity-related query category;

determine whether a current query of the plurality of queries is a follow-up query to a previous query by:

generating a first embedding vector of the current query;

providing the first embedding vector to a first classifier to generate a first prediction probability that the current query is a follow-up query of the previous query;

performing feature extraction on the first embedding vector and a second embedding vector of the previous query to generate extracted features;

providing the extracted features to a second classifier to generate a second prediction probability that the current query is a follow-up query of the previous query after the feature extraction; and determining that the current query is the follow-up query to the previous query using an ensemble based on the first prediction probability and the second prediction probability;

route the follow-up query to one of the plurality of AI assistants; and transmit a plurality of responses to the plurality of queries generated by the plurality of AI assistants.

16. The non-transitory computer-readable medium of claim 15, further comprising computer-executable instructions that, when executed by the component, cause the component to:

determine whether at least one of the plurality of queries is associated with a chat history; and determine whether the chat history includes one or more historical queries belonging to at least one query category.

17. The non-transitory computer-readable medium of claim 16, wherein the computer-executable instructions that, when executed by the component, cause the component to determine whether the at least one of the plurality of queries is associated with the chat history comprise computer-executable instructions that, when executed by the component, cause the component to:

determine whether the at least one of the plurality of queries is a follow-up query of the one or more historical queries in the chat history.

18. The non-transitory computer-readable medium of claim 17, further comprising computer-executable instructions that, when executed by the component, cause the component to:

append the at least one of the plurality of queries to the chat history based on a determination that the at least one of the plurality of queries is a follow-up query of the one or more historical queries in the chat history.

19. The non-transitory computer-readable medium of claim 16, wherein the plurality of responses are based at least in part on the plurality of queries and the chat history.

20. The non-transitory computer-readable medium of claim 15, wherein the plurality of queries include a first query and a second query following the first query, wherein the plurality of AI assistants include the first AI assistant assigned to respond to the first query and the second AI assistant assigned to respond to the second query, and wherein the plurality of responses include a first response generated by the first AI assistant and a second response generated by the second AI assistant.

21. The non-transitory computer-readable medium of claim 20, wherein the second response is generated based at least in part on the second query and the first response.

* * * * *